(12) United States Patent
Kocher

(10) Patent No.: US 10,755,540 B1
(45) Date of Patent: Aug. 25, 2020

(54) VIDEO ALERT AND SECONDARY VERIFICATION SYSTEM AND METHOD

(71) Applicant: Robert William Kocher, McLean, VA (US)

(72) Inventor: Robert William Kocher, McLean, VA (US)

( * ) Notice: Subject to any disclaimer, the term of this patent is extended or adjusted under 35 U.S.C. 154(b) by 28 days.

(21) Appl. No.: 15/932,797

(22) Filed: Apr. 27, 2018

Related U.S. Application Data

(60) Provisional application No. 62/602,936, filed on May 12, 2017.

(51) Int. Cl.
*G08B 13/196* (2006.01)
*G06K 9/00* (2006.01)
*H04N 7/18* (2006.01)

(52) U.S. Cl.
CPC ....... *G08B 13/196* (2013.01); *G06K 9/00255* (2013.01); *G06K 9/00288* (2013.01); *G06K 9/00771* (2013.01); *H04N 7/181* (2013.01)

(58) Field of Classification Search
CPC .......... G08B 13/196; G06K 9/00255; G06K 9/00288; G06K 9/00771; H04N 7/181
See application file for complete search history.

(56) References Cited

U.S. PATENT DOCUMENTS

| | | | | |
|---|---|---|---|---|
| 8,396,265 B1* | 3/2013 | Ross | ............... | G06K 9/00288 382/118 |
| 2006/0102843 A1* | 5/2006 | Bazakos | ............ | G06K 9/00255 250/339.05 |
| 2011/0311110 A1* | 12/2011 | Benini | ............... | G06K 9/00288 382/115 |
| 2012/0281885 A1* | 11/2012 | Syrdal | ..................... | G06F 21/32 382/116 |
| 2013/0063581 A1* | 3/2013 | Komatsu | ............ | G06K 9/00288 348/77 |
| 2013/0195316 A1* | 8/2013 | Bataller | ............. | G06K 9/00255 382/103 |
| 2016/0148066 A1* | 5/2016 | Duenias | ............. | G06K 9/00255 382/115 |
| 2016/0269401 A1* | 9/2016 | Saito | .................. | G06K 9/00275 |
| 2017/0223302 A1* | 8/2017 | Conlan | ............. | H04N 5/44504 |

* cited by examiner

*Primary Examiner* — Francis Geroleo

(57) ABSTRACT

A video alert and secondary confirmation system and method for detecting and verifying a person of interest is disclosed. The system and method include selecting an access way for detecting persons of interest. Independent video cameras are placed along the access way and have varying thresholds for identifying persons on a wanted list. Video alert modules operate in tandem with overlapping fields of view at a high threshold matching level. Each video camera is linked to a video alert module. Faces that are above a set threshold are displayed on a video alert module. A determination of match or no match is made. If a match appears to be made, a security team will be alerted to approach the individual who is an apparent match and take a closeup photograph that is analyzed to verify the match through a secondary confirmation.

16 Claims, 4 Drawing Sheets

VIDEO ALERT AND SECONDARY VERIFICATION SYSTEM AND METHOD

CROSS-REFERENCE TO RELATED APPLICATION

This application claims priority from U.S. Provisional Application 62/602,936 filed on May 12, 2017, and titled Video Alert and Secondary Verification System and Method.

BACKGROUND

Field of the Invention

This invention relates to video cameras and face matching systems. Specifically, the invention relates to a video alert and secondary verification system and method.

Description of the Related Art

Face recognition and detection systems currently include video cameras or other cameras, along with face matching algorithms. Typically, they are configured to look at a group of individuals walking through a portal or access way. The problem with the current art is that video cameras do not achieve high-quality photos because the people are moving, the angle varies, and facial orientation tends to produce sub-optimal photos. To detect individuals who are persons of interest, current video systems must reduce the threshold for face matching. The threshold is based on facial similarity and may also require minimum image quality. If the face matching threshold is set too low, there will be numerous false matches. If the face matching threshold is set too high, sought after individuals may go through undetected, unless an optimal photo happens to be taken of them. Current video face detection methods will normally raise the threshold to avoid the numerous false matches; but allow persons of interest a greater probability of getting by the face recognition and detection system undetected.

SUMMARY OF THE INVENTION

The video alert and secondary verification system of the invention has several advantages over the current state of the art. A key advantage of the invention is a preliminary alert module which is similar to today's current technology, but with the addition of a very accurate mobile matching module as the secondary verification system. The goal of any video monitoring system is achieving a significant reduction in false matches. By raising the threshold, a better photo is needed to obtain a match. One aspect of this invention is to use more than one video matching system, which we refer to as a video alert module. By placing multiple independent video alert modules along an access way, corridor, portal, etc. the chances of an individual looking into one of the cameras with a good angle and range is greatly increased. With the thresholds established higher, but with more systems, you can achieve greater reliability for detection and confirmation of persons of interest. Another aspect of this invention is to make matches based on multiple photos. If multiple photos match to the same person, then the probability of a correct match increases significantly.

A novel aspect of the invention is to use three independent systems, which allows different thresholds across the various cameras.

In addition, a novel aspect of the invention over the current state of the art is that the invention uses video alert modules in conjunction with mobile matching modules. This system allows an indication of a potential watch list person, followed by a secondary video verification and lastly, an up-close confirmation. The system thus provides a detection-in-depth approach by varying the matching thresholds. The mobile matching module therefore provides the highest matching accuracy in comparison with any current system.

A facial recognition algorithm uses a database of faces belonging to undesired persons, considered persons of interest; that is, a watchlist. Every image provided to the facial recognition algorithm may contain zero, one, or more faces. For every face in each image provided, the algorithm compares the photographed face to every face in the watchlist and calculates a similarity score. Whenever a photographed face is sufficiently similar to a watchlist face, the system responds in some way. One exemplary embodiment assumes there is a security guard interactively using the system. In that case, a user interface presents the photographed face alongside the watchlist face, and the guard examines both images in order to make a match/no-match decision. Another exemplary embodiment is based on a high threshold in similarity, that the photographed face matches the watchlist face. This occurs when the individual being photographed is closer to the camera or is at a better camera angle; and allows the system to operate autonomously, without a human user. The accuracy for autonomous operation can be improved using multiple cameras or multiple images. In response to a same match occurring between a photographed face and watchlist face in a short time period for multiple cameras or multiple images and in the expected sequence, according to the person's direction of travel and the location of the cameras, then the probability increases that the system's match decision is correct.

Regardless of whether match results are coming from fixed cameras or are provided by a human user or autonomously by the system, once a match is determined, the system can alert multiple other security guards. The alerting mechanism could be via SMS messages delivered to a cell phone. The messages can contain text information related to the match from the watchlist data, e.g. name, reason for being on the watchlist, special considerations such as likely behavior on contact, etc. as well as time and location of the image to indicate where the undesired person was and their direction of travel. In addition, both the face from the file containing persons of interest, i.e., the watchlist, and original camera image can be included and may be side by side. Both images help the security guard know who to look for. The original image is likely to show the person's overall appearance, including the color and type of clothing. The face helps the guard more clearly identify the person.

Once the guard locates the undesired person from the watch list, the guard will be able to verify the person's identity using a mobile device equipped with a face-matching application, based on a facial recognition algorithm. Mobile devices such as a smartphone, tablet etc. are equipped with a camera. In conjunction with the face-matching application, the guard can take good photographs using the mobile device and get face match results back to verify the identity of the individual. In response to the person indeed being on the watchlist, the guard can take appropriate action.

Figure 1:
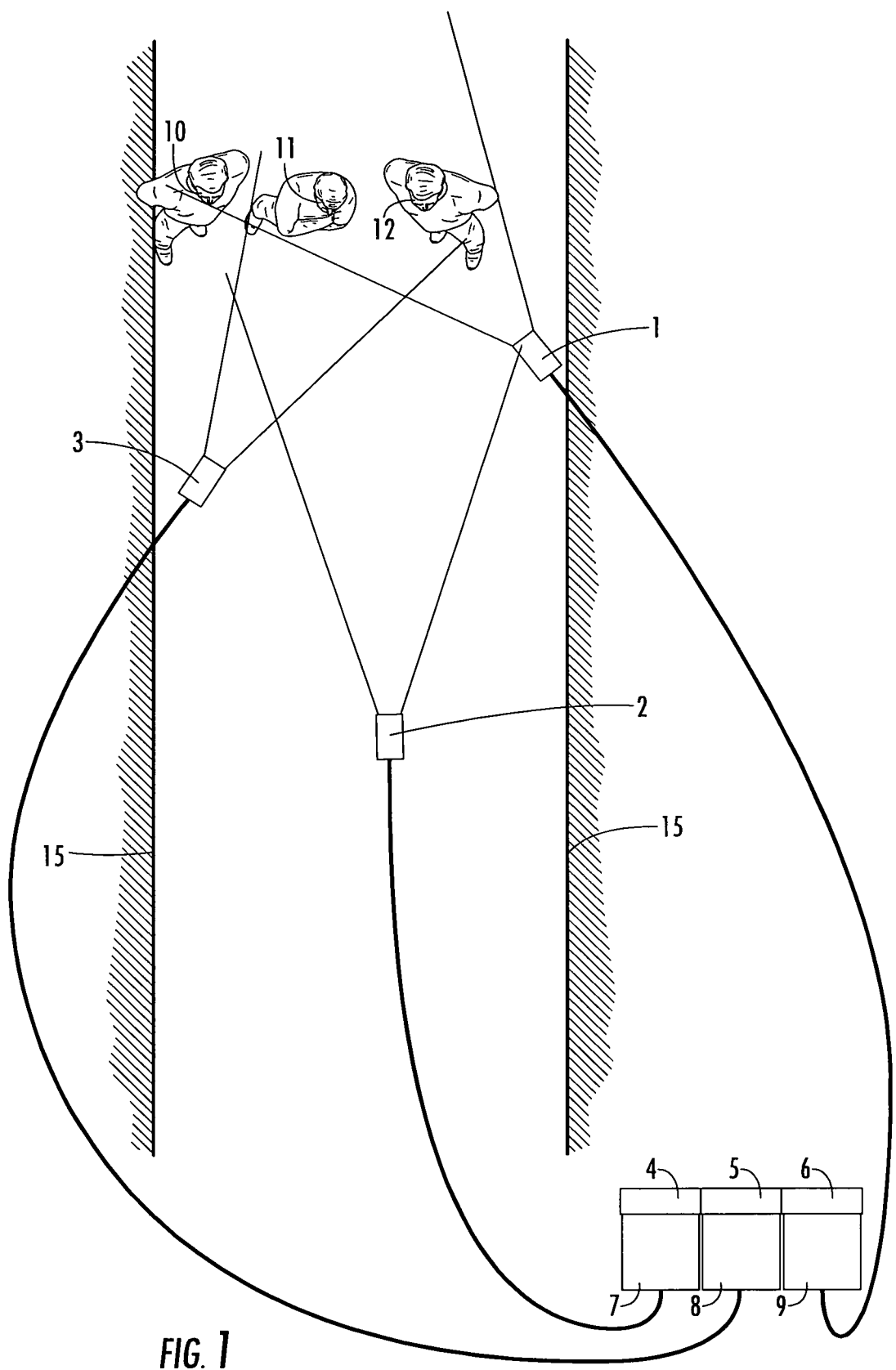
FIG. 1 depicts video alert modules configured along an access way.

DRAWING REFERENCE NUMERALS 1 video camera component of a video alert module 1 located in select location 1
2 video camera component of a video alert module 2 located in select location 2
3 video camera component of a video alert module 3 located in select location 3
4 computer and face matching algorithm component of video alert module 1
5 computer and face matching algorithm component of video alert module 2
6 computer and face matching algorithm component of video alert module 3
7 display component of video alert module 1
8 display component of video alert module 2
9 display component of video alert module 3
10 face of an individual walking through the access way
11 face of another individual walking through the access way
12 face of yet an individual that is contained in the face matching database walking through the access way that the system intends to detect
13 mobile matching module
14 security or intercept individual or team
15 access way
16 communication network

DETAILED DESCRIPTION OF THE EXEMPLARY EMBODIMENTS

FIG. 1 depicts three video alert cameras 1, 2, 3 configured in an access way 15. Connected to the video alert cameras are three independent computers 4, 5, 6 and three independent displays 7, 8, 9. Camera 1, module 9, and computer 6 comprise one video alert module. These modules function independently with the objective of staring at the access way, conducting face recognition, and once a facial recognition match is achieved above a threshold, the image of the match will be displayed on the respective video screen 7, 8, 9 linked to the respective video cameras 1, 2, 3. In order to assist the system operator, the video screens would only illuminate when there is a match which meets or exceeds the set facial match threshold. The alert can be the photo appearing on the screen, an audible or visual alert, or other methods to alert the system monitor to look at the screen. Individuals 10, 11, 12 walking through the access way 15 would have their face acquired overtly or covertly, but with a method that does not require the individual to look in a particular direction or conduct any abnormal actions. The system could also function in a manner which requires individuals to look in a specific direction or camera. When one or more of the display screen 7, 8, 9 illuminates with a facial match, the operator would press a button or respond with a match or no-match or unknown response which would indicate that the operator is unsure whether there was a match. By pressing a button, the operator can alert a security team 14. If there is no facial match, the operator can press a button to delete the photos from the screen. If the operator is uncertain as to whether there is a match, the operator has the option of alerting the security team.

Figure 2:
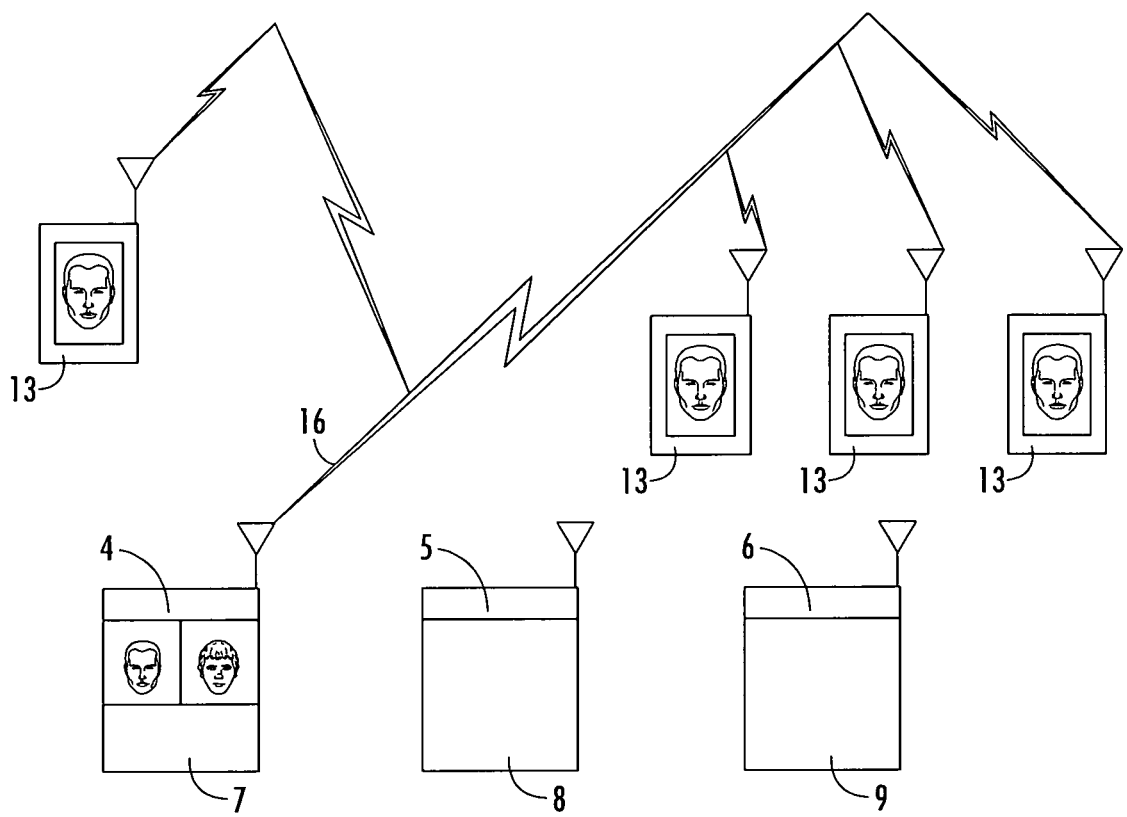
FIG. 2 depicts video alert modules communicating with mobile matching modules.

FIG. 2 depicts one of the video alert modules 7 having a facial match. The operator examines the two displayed photos on the screen 7 and determines if there is a match. The operator makes a determination whether or not the match is sufficient enough to alert the security team 14. A communication network 16 transmits the photo or description of the individual to each mobile matching module 13. Each mobile matching module 13 would display the photo or description of the individual sought and if desired, would enter the photo into its database.

Figure 3:
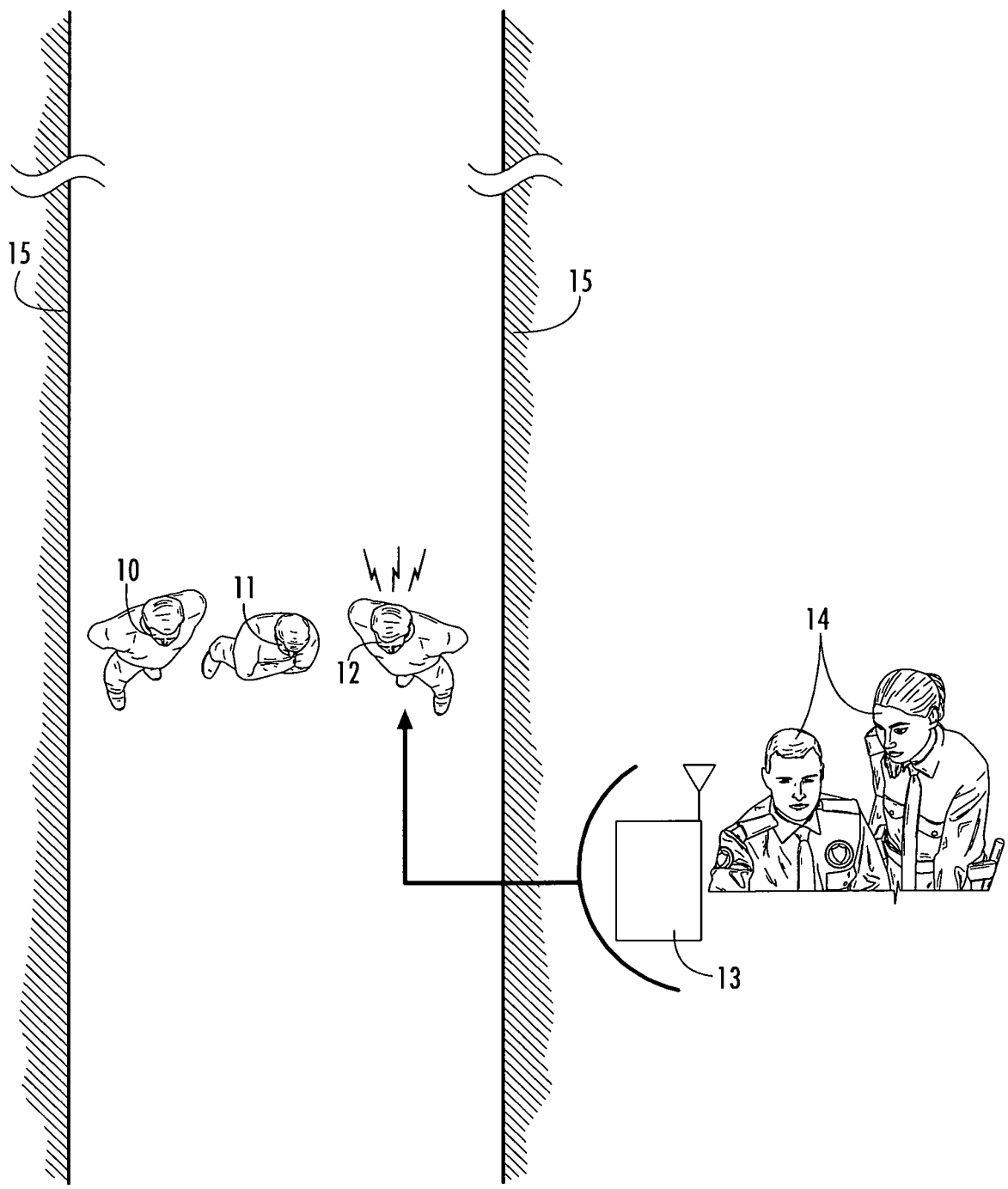
FIG. 3 depicts a security team intercepting a matched person.

FIG. 3 depicts the security team 14 approaching the matched individual 12. The security team 14 approaches the individual 12 which has been matched as a person of interest on the watch list and initiates a more accurate secondary verification whether the person is or is not on the watch list. The mobile matching modules 13 are used in a deliberate method whereby the individual is asked if a photo can be taken and a security team 14 would use the mobile matching module 13 to take a photo in optimal range, angles and conditions. Since the video alert modules' cameras are configured to look at people on the move, most photos are not at an optimal position or distance. The mobile matching modules are essential in determining secondary accurate identity verification. Since the video alert modules are conducting matches from non-optimal photos (such as off-axis, on the move, varying range, lighting conditions, blurred motion, etc.) a secondary verification device is used, and is displayed on a mobile matching module 13. The photos taken by the mobile matching module 13 are taken in a more pristine environment with correct face orientation and distances. If the individual being photographed is in the database, the mobile matching module will display a significantly higher match score than the video alert module. Should the individual not be in the watch list database, the mobile matching module 13 will indicate a no-match or a significantly lower match score.

Figure 4:
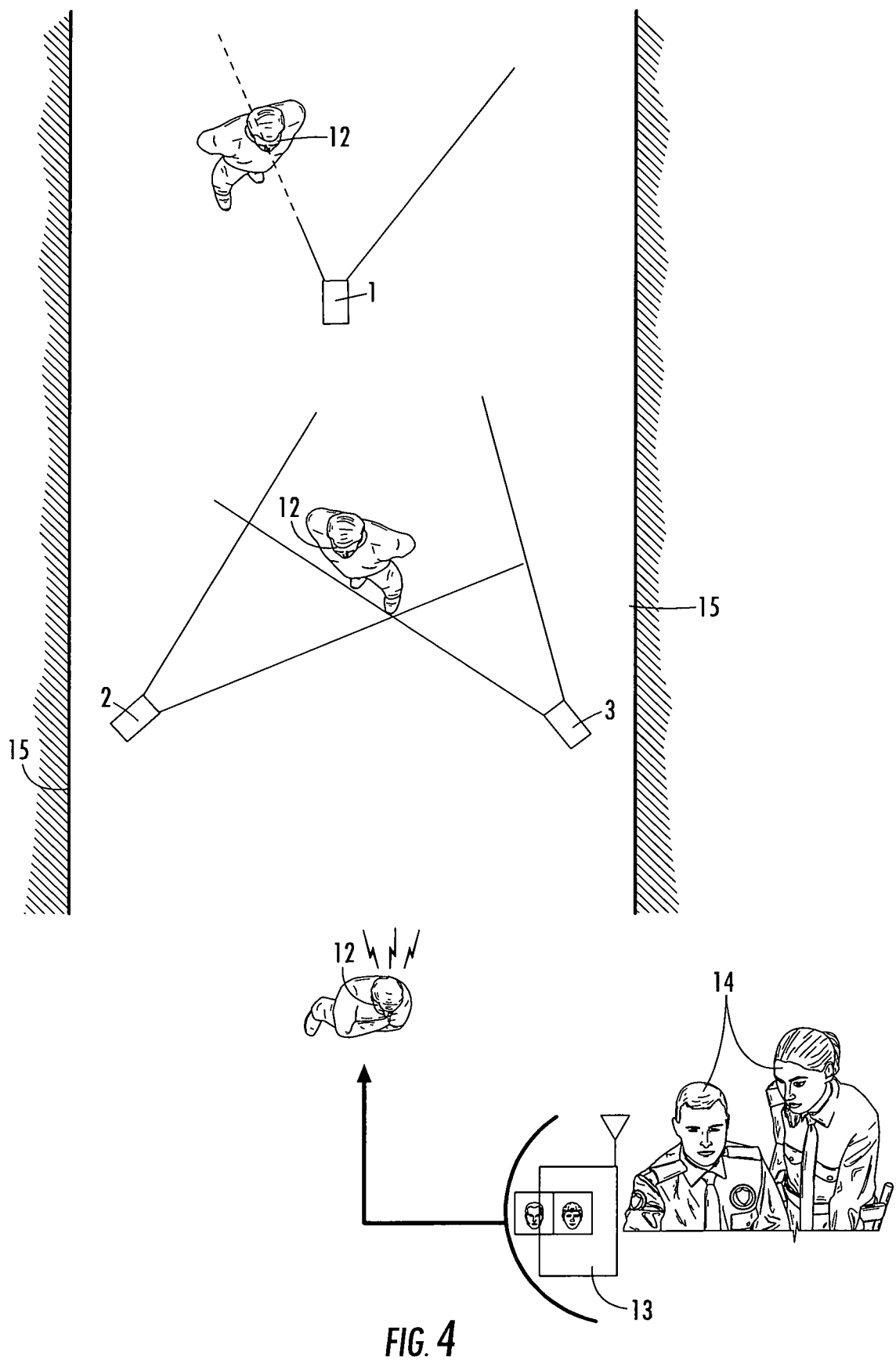
FIG. 4 depicts a configuration for varying facial match thresholds.

FIG. 4 depicts three independent systems, allowing for varying match thresholds. The cameras are located within access way 15. The first video alert module camera 1 could have a low threshold for face matching; it would provide the first level of detection called Indication. This lower threshold would provide an alert if persons of interest 12 are approaching, but since it has a low threshold there would likely be a high false alarm rate. The operator could view the suspected matches and be alerted ahead of the next phase, which would inform the operator that there's a possibility a match could be made at one of the next two cameras 2, 3. The next layer of identification would be the two cameras 2, 3 in tandem with a higher match threshold; this would be the second level of detection called Action. The multiple cameras would attempt to minimize off-angle views, meaning that if the individual was looking to his right the camera to the left would not catch him, but his looking to the right would optimize his photo with the camera on the right. These two cameras 2, 3 would assist the operator in determining action or no action. The no action decision would be made when the operator determines there is no match. In response to the operator determining that a match has been made, he/she can alert the security teams and send the photo to them. The security teams would then approach the individual with their mobile matching modules 13 to get a higher quality photo and get a confirmation of match. This third level of detection is called Confirmation. The thresholds on the mobile matching module are set very high, since they will be taking a controlled picture. In response to a match being made with a high threshold, the security team will verify the match and take appropriate action.

The invention claimed is:

1. A method for detecting and verifying a person of interest by:
   selecting an entry area, portal, or access way for detecting persons of interest;
   arranging video cameras within the entry area, portal or accessway to optimize facial capturing of an image of a possible person of interest through likely fields of view of one or more video cameras in order to capture images of persons of interest who are looking away from the cameras;
   linking each video camera to independently searchable video alert modules which are tied to a database having a watch list of persons of interest;
   displaying faces that are above a set threshold on the video alert modules;
   determining a match or no-match of the displayed face on mobile matching modules at a higher threshold for determining a match than the threshold used in the video alert modules;
   alerting one or more security teams of matches by transmitting a photo or description of the matched individual to their mobile matching modules; and,
   approaching said matched individual and conducting further identification of said individual with the mobile matching module by taking a closeup picture of the matched individual under optimal range, angle and conditions in order to confirm that the match of the individual is accurate at a higher threshold, wherein a three-system method of detecting and verifying an individual with increasing threshold for confirmation of identification at each successive system is provided.

2. The method of claim 1, wherein each of the video cameras are spaced along different locations along the entry area, portal or access way.

3. The method of claim 2, wherein each of the video cameras point into the entry area, portal or access way at different angles to photograph different aspects of the facial structure of the individual being reviewed.

4. The method of claim 1, wherein at least one of the video alert modules includes a computer having a database which includes therein images and other information regarding persons of interest who are on a wanted list.

5. The method of claim 4, wherein each of the video alert modules includes a computer having a database including therein persons of interest who are on a wanted list.

6. The, method of claim 1, wherein at least one of the video alert modules displays both the facially recognized individual and the picture of the individual in the database of wanted individuals.

7. The method of claim 6, wherein each of the video alert modules has a display of the facially recognized individual and the picture of the individual in the database of wanted individuals.

8. The method of claim 1, wherein each of the video alert modules transmits the matched facial image to the mobile matching modules upon determination by an operator of the video alert module that there is a match or when the operator is unsure of a match.

9. A video alert and secondary confirmation system comprising:
   a. one or more video alert modules comprising:
      i. one or more video collection cameras;
      ii. one or more computers with a separate computer for each camera;
      iii. a face match algorithm in a database included with each of the computers; the face match being set at a low threshold;
      iv. a database of persons of interest who are on a watch list in communication with each of the video alert modules;
      v. a video screen attached to each video alert module, which displays matches from both the face match algorithm and the watch list on the video screen; wherein each video collection camera, computer and video screen comprise a video alert module;
      vi. a communication system that communicates with one or more mobile match modules;
   b. the one or more mobile matching modules each comprising;
      i. a mobile communications device comprising:
      ii. a video collection camera;
      iii. a computer;
      iv. a face match algorithm in a database that is part of the computer;
      v. a database of persons of interest who are wanted by the authorities;
      vi. a video screen which displays matches from the one or more video alert modules; wherein matches determined by the video alert modules are analyzed at a higher threshold for determining a match than at the video alert module or modules;
      vii. a communication system that communicates with the said one or more mobile matching modules;
      at the one or more mobile match modules, a higher threshold is used by security taking a closeup picture of the matched individual under optimal range, angle and conditions in order to confirm that the match of the individual is accurate at a higher threshold, wherein a three layer system of detecting and verifying an individual with increasing threshold at each layer for confirmation of identification is provided.

10. The video alert and secondary confirmation system of claim 9, wherein the one or more individual video alert modules are each combined into one computer.

11. The video alert and secondary confirmation system of claim 9, wherein each of the one or more video alert modules have a different threshold for determining facial recognition.

12. The video alert and secondary confirmation system of claim 9, wherein there are a plurality of video alert modules spaced at different locations along an entry area, portal or access way.

13. The video alert and secondary confirmation system of claim 12, wherein each of the video cameras point into the entry area, portal or access way at different angles to photograph different aspects of the facial structure of the individuals being reviewed.

14. The video alert and secondary confirmation system of claim 13, wherein there are a plurality of video alert modules and each of the video alert modules displays both the facially recognized individual and the picture of the individual in the database of persons of interest who are on the wanted list.

15. The video alert and secondary confirmation system of claim 14, wherein each of the video alert modules transmit the matched facial image to the mobile matching modules upon determination by an operator that of the video alert module that there is a match or when the operator is unsure of a match.

16. A method for detecting and verifying a person of interest, the method comprising:
   a. selecting an entry area, portal, or access way for detecting persons of interest;

b. arranging an independent video camera at a location and a low match threshold as an initial indication of a match;

c. arranging a plurality of forward independent video cameras at various locations to allow various levels of detection to occur so the cameras cannot be avoided by the person of interest;

d. wherein the forward plurality of independent video cameras operate at a higher match threshold;

e. each of the plurality of forward independent video cameras, along with a computer and screen for each of the plurality of forward independent video cameras comprises a video alert module; the video alert modules operate in tandem with overlapping fields of view;

f. linking each said independent video cameras to independently searchable video alert modules;

g. displaying faces that are above the threshold on the said video alert module; determining a match or no-match, and forwarding the displayed face to one or more mobile matching modules;

h. alerting security teams of matches by transmitting a photo of the face or description of the matched individual to the mobile matching modules as an action level of detection, and;

i. the security teams approaching said matched individual to conduct further identification of the individual with the said mobile matching module as a confirmation; and j. by taking a closeup picture of the matched individual under optimal range, angle and conditions to confirm that the match of the individual is accurate at a higher threshold, wherein a three-layer method of detecting and verifying an individual with increasing threshold for each succeeding layer for confirmation of identification is provided.

* * * * *